United States Patent [19]
Kaneko

[11] Patent Number: 5,066,948
[45] Date of Patent: Nov. 19, 1991

[54] RECEIVER FOR USE IN REMOTE CONTROL SYSTEM

[75] Inventor: Yoshiyuki Kaneko, Kawasaki, Japan

[73] Assignee: Canon Kabushiki Kaisha, Tokyo, Japan

[21] Appl. No.: 577,075

[22] Filed: Sep. 4, 1990

Related U.S. Application Data

[63] Continuation of Ser. No. 100,828, Sep. 25, 1987, abandoned.

[30] Foreign Application Priority Data

Oct. 1, 1986 [JP] Japan ................................ 61-234160

[51] Int. Cl.[5] ................................................ H04Q 7/00

[52] U.S. Cl. ........................... 340/825.69; 340/825.72; 358/194.1

[58] Field of Search ...................... 358/194.1; 455/603; 340/825.69, 825.72, 825.65, 533, 825.71; 324/78 R, 78 D; 375/34, 51, 58; 371/64

[56] References Cited

U.S. PATENT DOCUMENTS

| | | | |
|---|---|---|---|
| 3,337,992 | 8/1967 | Tolson | 340/533 X |
| 3,585,596 | 6/1971 | Rosenblatt | 340/825.65 |
| 4,143,368 | 3/1979 | Route et al. | 455/603 X |
| 4,445,767 | 5/1984 | Kawazoe | 354/195.1 |
| 4,602,255 | 7/1986 | Kitagawa et al. | 340/825.72 X |
| 4,713,660 | 12/1987 | Camenzind | 340/825.69 |

FOREIGN PATENT DOCUMENTS

| | | | |
|---|---|---|---|
| 0156091 | 12/1981 | Japan | 390/825.72 |
| 0168488 | 12/1981 | Japan | 340/825.72 |
| 0162189 | 9/1983 | Japan | 340/825.72 |

*Primary Examiner*—Ulysses Weldon
*Attorney, Agent, or Firm*—Fitzpatrick, Cella, Harper & Scinto

[57] ABSTRACT

A receiver for use in a remote control system such as a remote controller for remotely controlling, for example, shutter release operation of a camera. The remote control system makes use of a remote control signal such as infrared pulses of a predetermined period or frequency. The receiver has a counter for counting a received signal at a timing synchronous with the period of the remote control signal, and a judging circuit for judging the received signal as being the remote control signal when the value counted by the counter has reached a predetermined value in a predetermined counting period.

10 Claims, 4 Drawing Sheets

RECEIVER FOR USE IN REMOTE CONTROL SYSTEM

This application is a continuation of application Ser. No. 100,828, filed Sept. 25, 1987, now abandoned.

BACKGROUND OF THE INVENTION

1. Field of the Invention

The present invention relates to a receiver for use in a remote control system which makes use of a remote control signal of a predetermined period. More particularly, the invention is concerned with a receiver for use in a wireless remote control system such as a system for controlling the shutter releasing operation of a camera from a remote place.

Hitherto, various types of signal transmitters and receivers suitable for use in remote control systems have been proposed. In general, remote control systems have suffered a problem in that the receiver inevitably receives various noises besides the remote control signal, and the intensity of the remote control signal is lowered substantially in inverse proportion to the square of the distance between the transmitter and the receiver. Therefore, it is a common measure to use a pulse signal as the remote control signal so as to enable the receiver to easily discriminate the control signal, thereby ensuring a high reliability of the remote control despite a large distance between the signal transmitter and receiver.

A single-purpose remote control signal transmitter/-receiver, which makes use of pulse-modulated infrared rays as the remote control signal, will be described with specific reference to FIGS. 4 and 5 by way of example.

Referring first to FIG. 4, a transmitter has an oscillation circuit 1 adapted to produce a train of pulses of a predetermined modulating frequency. When a switch 6 is closed, the pulses are delivered to the base of a transistor 3 through a base resistor 5. An infrared light-emitting diode (referred to as "iLED", hereinafter) denoted by a numeral 2 is adapted for emitting an infrared signal. In order to protect the iLED 2 from any overcurrent, a current-limiting protection resistor 4 is connected to the transistor 3. The oscillation circuit 1 and the iLED 2 are activated by power supplied from a source battery 7.

Referring now to FIG. 5, a receiver has a photodiode 8 adapted for receiving the infrared signal, a load resistor 9, a coupling capacitor 10, an amplifier 11, a detector circuit 12 for detecting the signal component of a predetermined signal frequency, a wave shaping circuit 13, and a code conversion circuit 14 which constitutes an interface between the receiver and a camera.

The operation of this remote control system will be explained hereinunder with reference to the waveform chart shown in FIG. 6.

The oscillation circuit 1 shown in FIG. 1 oscillates at the modulation frequency of the remote control signal. The output of this circuit is input to the base of the transistor 3 while the switch 6 is closed as shown by a waveform (a) in FIG. 6. In consequence, the transistor 3 is repeatedly turned on and off at the modulation frequency as shown by a waveform (b) in FIG. 6, so that a pulse current of the modulation frequency is supplied to the iLED 2.

Meanwhile, the photodiode 8 serving as the light-receiving element in the receiver circuit shown in FIG. 5 is negatively biased by the source voltage $V_{cc}$ through the load resistor 9, so that an electric current of a level substantially proportional to the quantity of the received light flows through the photodiode 8. As a result, a voltage substantially proportional to the received light quantity appears across the resistor 9, i.e., between the ground level and the juncture between the photodiode 8 and the resistor 9. The AC component of this voltage is transmitted to the amplifier 11 through the coupling capacitor 10. This AC component is represented by S; in FIG. 6. The signal $S_1$ inevitably contains noises, i.e., external lights other than the signal light, such as light from illuminating lamps or fluorescent lamps, as will be seen from the waveform (c) in FIG. 6. The signal $S_1$ is fed to the detection circuit 12 which picks up only the signal component of the modulation frequency transmitted from the transmitter. Thus, the detection circuit 12 delivers an output signal having a waveform as shown by (d) in FIG. 6. This signal is shaped through the shaping circuit 13 to become a signal $S_3$ having a waveform as shown in (e) in FIG. 6. This signal $S_3$ is converted by an interface circuit 14 into a signal for controlling the camera.

Thus, conventional remote control systems employ a pulse-modulated remote control signal which improves the S/N ratio at the receiving side, thereby attaining a higher reliability of the remote control.

In such conventional remote control systems, the detection circuit such as the circuit 12 shown in FIG. 5 usually employs a band-pass filter having a high Q value which represents a sharp frequency selectivity. The use of a band-pass filter having such a high Q value is necessary in order to pick up a weak light signal from among various signal components including noises. The high Q value in turn requires a tuning circuit composed of a coil and a capacitor. The coil, however, is generally large in size compared to other circuit components such as resistors and capacitors and essentially requires means for adjusting the inductance. Consequently the size of the receiver is increased and the cost of the same is raised due to the use of the coil.

SUMMARY OF THE INVENTION

Accordingly, an object of the present invention is to provide a receiver for use in a remote control system, which is reduced in size and which has a sharp frequency selectivity without employing any coil-capacitor type tuning circuit and without requiring any inductance adjustment, thereby overcoming the above-described problems of the prior art.

To this end, according to the present invention, there is provided a receiver for use in a remote control system which makes use of a remote control signal of a predetermined period, comprising: counter means adapted for counting received signals at a time interval synchronous with the period of said remote control signal; and judging means adapted to judge the received signal as being the remote control signal, when the counter means has counted a predetermined value in a predetermined time.

The above-mentioned predetermined value to be judged by the judging circuit is set at the number which is to be counted when the received signal is the remote control signal.

In another aspect of the present invention, there is provided a receiver for use in a remote control system which makes use of a remote control signal of a predetermined period, comprising: conversion means for converting the received signal into a digital pulse signal; pick-up means for picking up the digital pulse signal in snychronism with the period of the remote control signal, and for counting the number of times that the digital pulse signal is picked up; and judging means for judging the receive signal as being the remote control signal when the value counted by the pick-up means has reached a predetermined value in a predetermined period.

The above and other objects, features and advantages of the present invention will become clear from the following description of the preferred embodiments taken in conjunction with the accompanying drawings.

DESCRIPTION OF THE PREFERRED EMBODIMENTS

Figure 1:
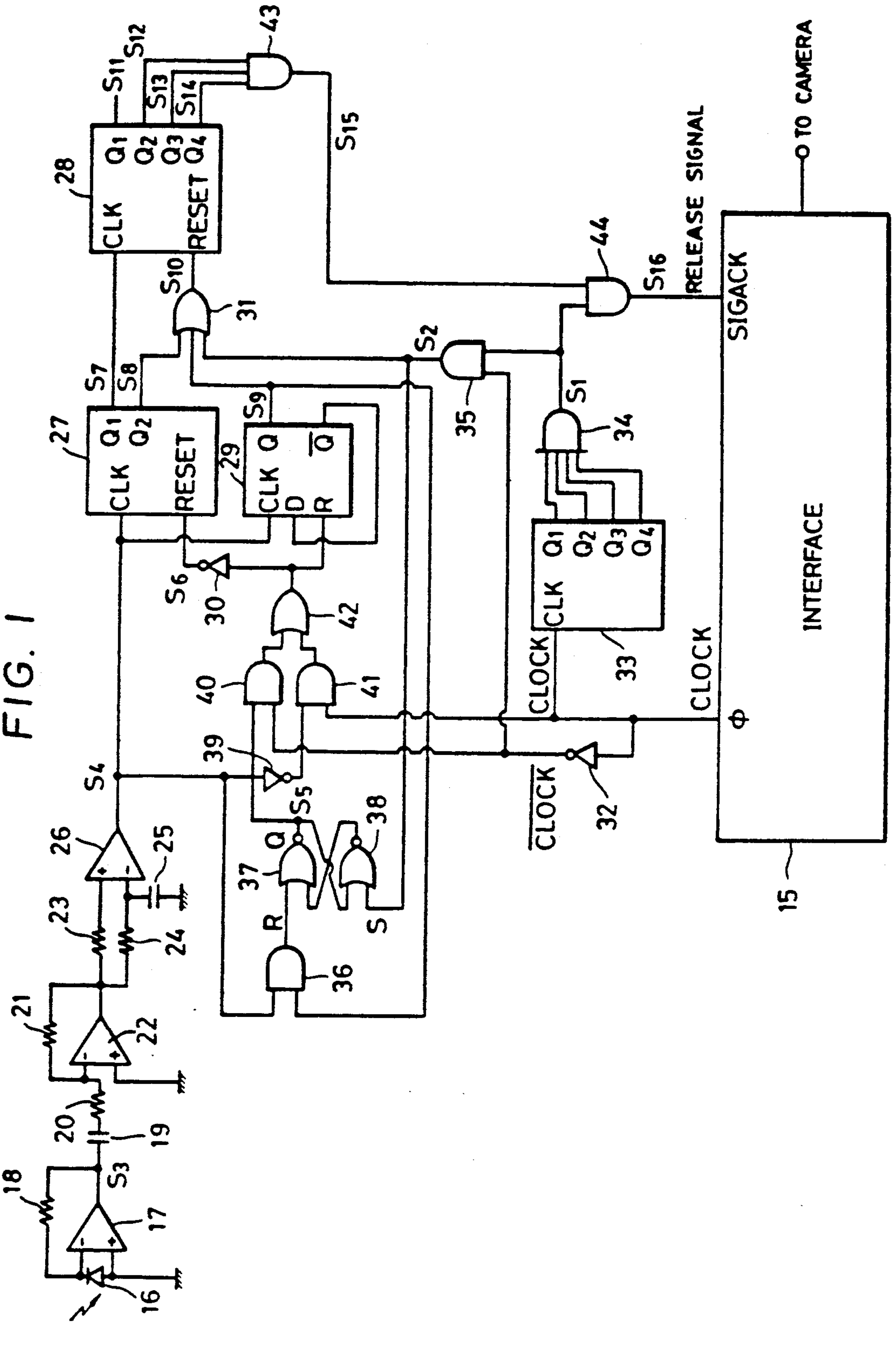
FIG. 1 is an illustrative of an embodiment of a receiver of the present invention for use in a remote control system.

Referring to FIG. 1, there is shown a circuit of a receiver embodying the present invention adapted to be used in a remote control system such as, for instance, a system for remotely controlling the operation of device which may be a camera. The circuit has an interface circuit 15 through which the receiver is connected to the camera. The circuit also has a photodiode 16 as a light-receiving element, an operation amplifier 17 and a resistor 18 which constitute means for converting a light signal into a voltage signal. The output voltage signal is fed through a coupling capacitor 19 to an amplifier circuit which is constituted by resistors 20, 21 and an operation amplifier 22. The output from this amplifier circuit is delivered via resistor 23 to the non-inversion input terminal of a comparator 26. This output also is delivered to the inversion input terminal of the comparator 26 through a low-pass filter which is composed of a resistor 24 and a capacitor 25. The output from the comparator 26 is delivered to a clock input terminal of counter 27, to a clock input terminal of a D-flip-flop 29, an inverter 39, and an AND gate 36. The other input terminal of the AND gate 36 receives the output from the D-flip-flop 29 mentioned above.

The circuit also has NOR gates 37 and 38 which in combination constitute an RS-flip-flop. The Q output from this RS-flip-flop is delivered to a select input terminal of a multiplexer having two inputs and one output, the multiplexer being composed of the inverter 39, AND gates 40, 41 and an OR gate 42. The set input terminal of the RS-flip-flop constituted by the NOR gates 37 and 38 receives the output from the AND gate 35, while the reset terminal of the same receives the output from the AND gate 36. An input terminal of the above-mentioned multiplexer also receives a clock signal CLOCK derived from the interface circuit 15 and a clock signal CLOCK which is transmitted through an inverter 32. The output terminal of the multiplexer is delivered to the reset terminal of the D-flip-flop 29 and also after being inverted by the inverter 30 to the reset terminal of the counter 27.

The clock signal CLOCK from the interface circuit 15 is input to the clock terminal CLK of a counter 33 which is adapted to produce a 4-bit signal $Q_1$ to $Q_4$ which are delivered to a 4-input AND gate 34. The output from the AND gate 34 is delivered both to the AND gate 35 and an AND gate 44. The other input terminal of the AND gate 35 receives the clock signal CLOCK which is output from the inverter 32.

The output $Q_1$ from the counter 27 is delivered to the clock input terminal CLK of a counter 28 adapted to produce outputs $Q_1$ to $Q_4$. The outputs $Q_2$ to $Q_4$ out of these four outputs are delivered to input terminals of 3-input AND gate 43. A 3-input OR gate 31 receives the output $Q_2$ from the counter 27, the output Q from the D-flip-flop 29, and the output from the AND gate 35. The input D of the D-flip-flop 29 receives the output Q from the same flip-flop 29. The AND gate 44 mentioned before receives both the output from the AND gate 43 and the output from the AND gate 34. The output from the AND gate 44 is connected to the interface circuit 15.

The operation of this circuit will be explained with reference to the waveform charts shown in FIGS. 2 and 3.

Figure 4:
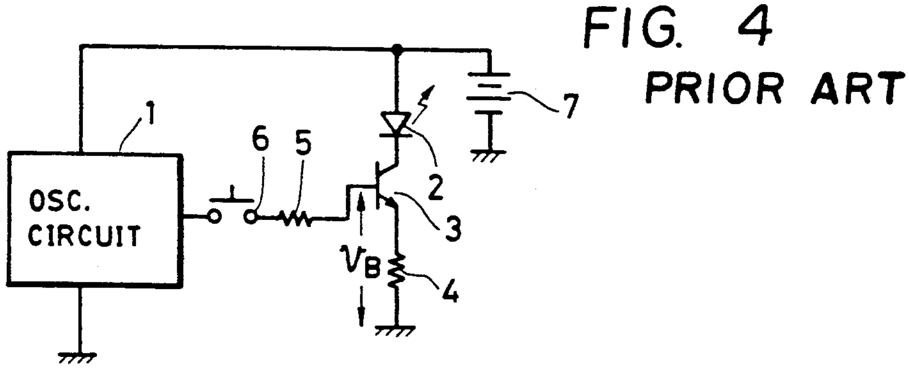
FIG. 4 PRIOR ART
FIG. 4 is an illustration of a signal transmitter in a typically known remote control system.
Figure 5:
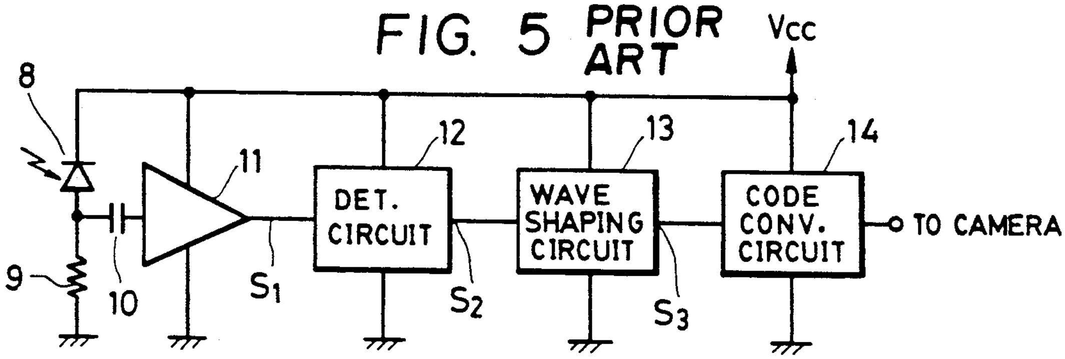
FIG. 5 PRIOR ART
FIG. 5 is an illustration of a signal receiver which is used in combination with the transmitter shown in FIG. 4.
Figure 6:
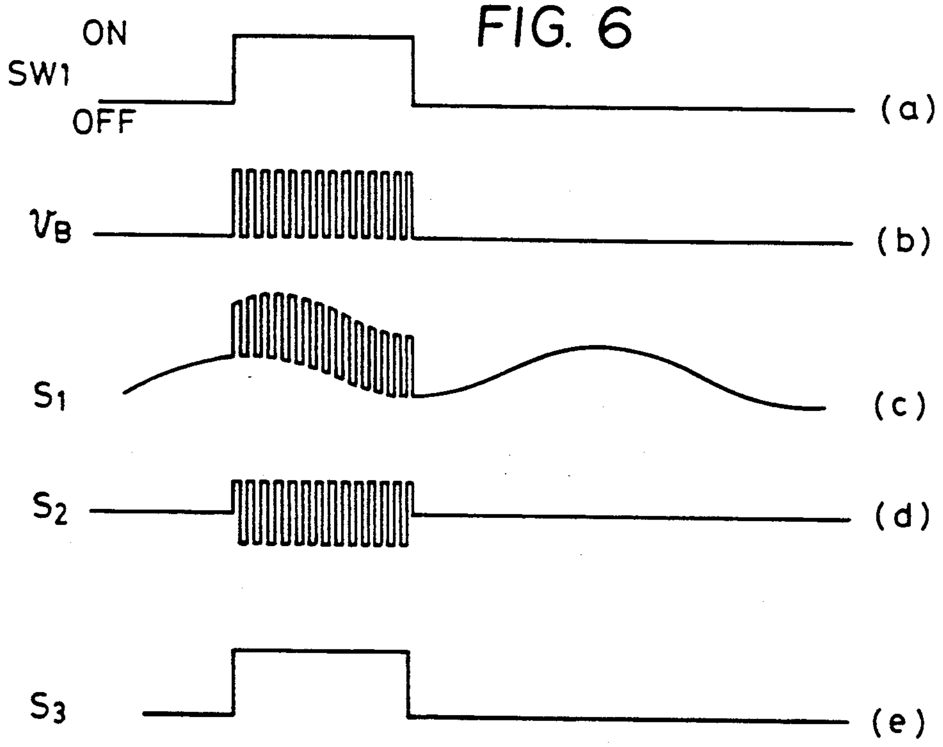
FIG. 6 is a waveform chart illustrating the operation of the circuit shown in FIG. 4.

It is to be understood that the receiver having the described circuit arrangement is used in combination with a remote control signal transmitter of the type described before in connection with FIG. 4. It is assumed here that the transmitter is adapted to transmit pulses of light at a frequency $f_s$ as a remote control signal.

As explained before, the remote control signal receiver of the present invention incorporates a signal detection means which is adapted to count the number of pulses of light received in a predetermined time T, and judging means which is adapted to judge whether the frequency of the light pulses received is equal to the transmission frequency $f_s$, i.e., the frequency of the remote control signal, through examining the number of the counted pulses as to whether this number coincides with the number of pulses which is to have been received if the received and examined signal is the remote control signal. This judging operation will be described in more detail hereinafter.

Referring to FIG. 1, the frequency of the clock signal CLOCK derived from the interface circuit 15 is set to be equal to the frequency $f_s$ of the remote control signal transmitted from the transmitter. The line for transmitting the clock signal CLOCK from the interface circuit 15 is branched into two lines one of which leads to the counter 33. In the described embodiment, the counter 33 is a hexadecimal-notation counter so that the AND of the outputs $Q_1$ to $Q_4$ thereof has a waveform as shown by $S_1$ in FIG. 2. The AND gate 35 is adapted for performing an AND operation of the signal $S_1$ and the clock signal CLOCK which is obtained through the inverter 32. In the illustrated embodiment, the pulses of light mentioned above are counted throughout a period T (see FIG. 2) which coincides with the period in which the level of the signal $S_2$ is "LOW".

The signal light from the transmitter is received by the photodiode 16 and an electric current substantially proportional to the quantity of the received light flows in the photodiode 16. This electric current is converted into voltage through the resistor 18 and the operation amplifier 17. The thus obtained voltage signal is represented by $S_3$. Thus, a signal $S_3$ of the waveform as shown in FIG. 2 is obtained as the output from the operation amplifier 17 when the remote control signal of the frequency $f_s$ is received by the photodiode. Then, the DC component of this output signal $S_3$ is made to flow through the capacitor 19 so that any DC component of this signal is removed and the thus processed signal is amplified by the amplifier constituted by the resistor 21 and the operation amplifier 22, the output from which is delivered to the comparator 26.

The low-pass filter annexed to the comparator 26 through the resistor 23 and composed of the resistor 24 and the capacitor 25 is designed for allowing signal components of frequencies below the frequency of commercial electric power supply, i.e., ripple frequency of incandescent lamp, while cutting the signal component of higher frequency. The non-inversion input terminal of the comparator 26 receives the output from the operation amplifier 22, while the inversion input terminal of the same receives only the low-frequency components of the output from the operation amplifier 22. In consequence, a signal $S_4$ consisting of the higher frequency component in the form of pulses is obtained as the output from the comparator 26, as shown in FIG. 2. It will be seen that this signal $S_4$ is derived from the light signal received by the photodiode 16. The thus obtained signal $S_4$ is sent to the counter 27 which judges whether this signal is a periodical signal and, if the signal $S_4$ is a periodical signal which cyclically turns on and off at a predetermined period, the signal is passed to the counter 28 which counts the number of pulses of this signal. However, if the signal $S_4$ is not periodical, the counter 28 is reset, as will be discussed in detail later.

The RS-flip-flop composed of the NOR gates 37 and 38 is set in response to the rise of the signal $S_2$ from the AND gate 35, at a moment $t_1$ prior to the above-mentioned counting period T for counting the number of pulses of the signal $S_4$. Thus, the RS-flip-flop produces an output signal $S_5$ as shown in FIG. 2.

This output signal $S_5$ is input as a select signal to the multiplexer which is composed of an inverter 39, AND gates 40, 41 and an OR gate 42. Therefore, the multiplexer selects the clock signal CLOCK and the OR gate 42 is set for outputting the clock signal CLOCK, thus giving the timing for the resetting of the D-flip-flop 29.

The counter 27 is reset in inverted phase relation to the D-flip-flop 29 in response to the output $S_6$ from the inverter 30.

Assuming here that the signal $S_4$ input to the counter 27 rises while the signal $S_6$ is "LOW", the output $Q_1$ from the counter 27 rises so as to cause an increment "1" of the content of the counter 28. However, when the signal $S_6$ is "HIGH", the counter 27 is reset so that the $Q_1$ output therefrom is changed to "LOW".

If the light impinging upon the photodiode 16 is the remote control signal which is the light pulses having the frequency $f_s$, the signal $S_4$ derived from the remote control signal has the same frequency as the signal $S_6$ and has the form of periodical pulses which rise when the signal $S_6$ is "LOW" and fall when the same is "HIGH". Therefore, the counter 28 receives a pulse signal $S_7$ as shown in FIG. 2, and delivers output signals $S_{11}$ to $S_{14}$ from its outputs $Q_1$ to $Q_4$. Then, at a moment $t_2$, the counter 28 counts the 14th pulse and the signals $S_{12}$ to $S_{14}$ derived from the outputs $Q_2$ to $Q_4$ are changed to "HIGH", thereby changing the output $S_{15}$ of the AND gate 43 to "HIGH". The signal $S_{15}$ is delivered to the AND gate 44 which also receives the signal $S_1$. Therefore, the AND gate 44 produces an output $S_{16}$ of the high level "HIGH" at a moment $t_3$ at which the input signal $S_1$ is changed to "HIGH". Thus, the AND gate 44 serves as the judging means which constitutes an essential portion of the receiver in accordance with the present invention. The counter 28 is reset in response to a signal from the OR gate 31 at a moment $t_4$ at which the signal $S_2$ is changed to "HIGH", so that the signal $S_{16}$ is changed to "LOW" at this moment $t_4$.

Figure 2:
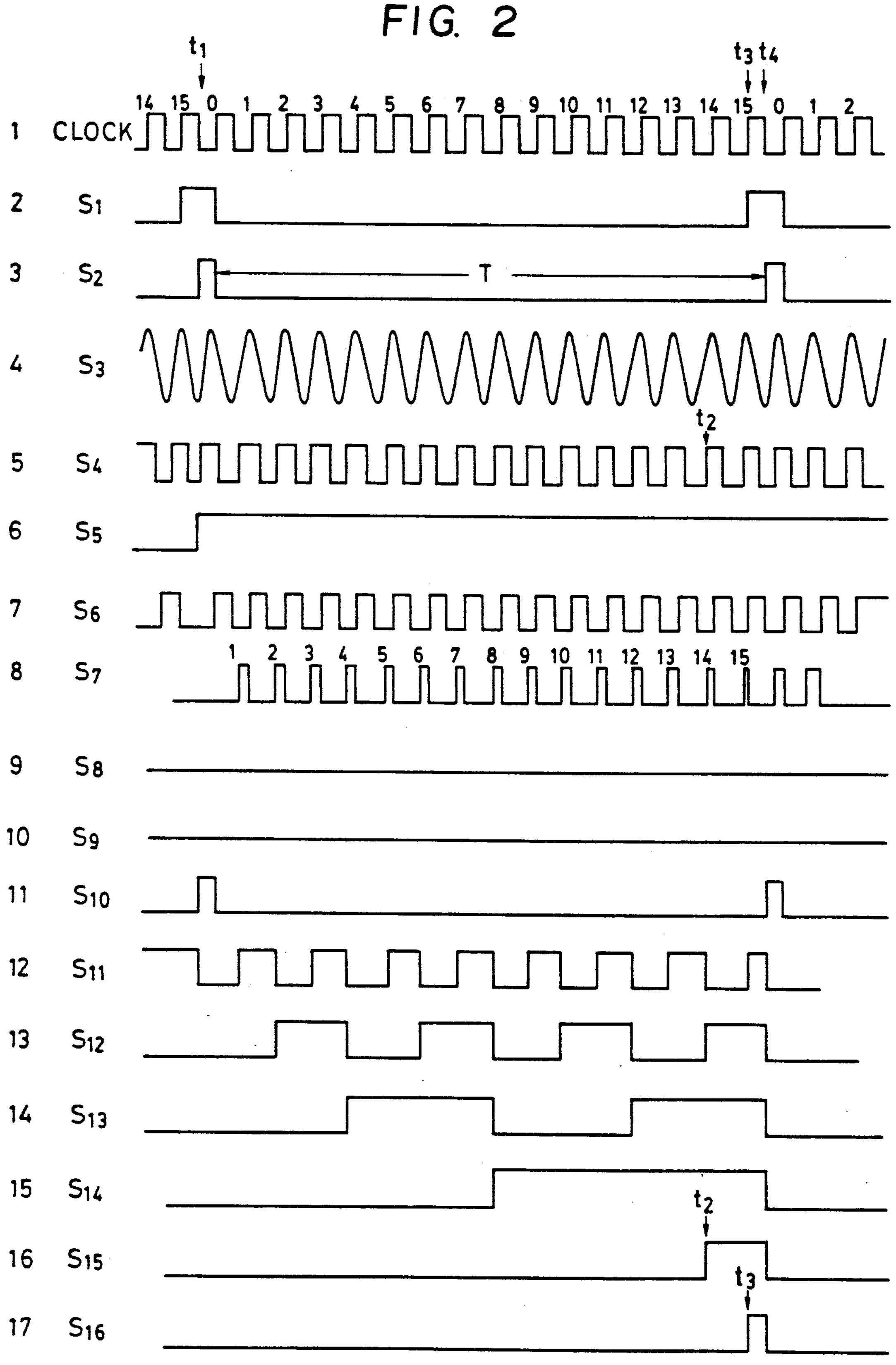
FIGS. 2 and 3 are waveform charts for explaining the operation of the embodiment shown in FIG. 1.
Figure 3:
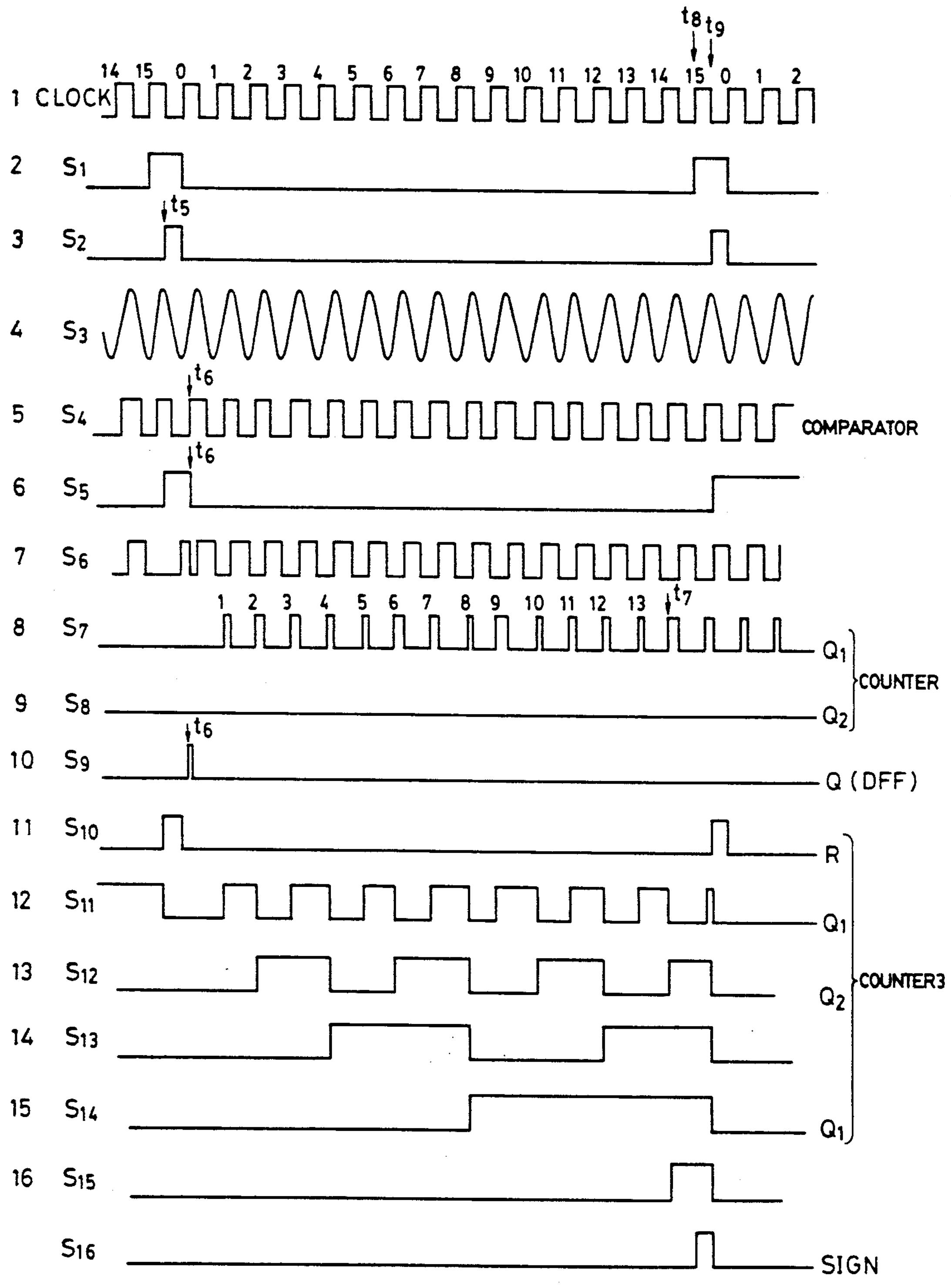

When the light pulses of the frequency equal to the signal frequency $f_2$, i.e., equal to the frequency of the clock signal CLOCK, is received, the signal $S_{16}$ is held at high level "HIGH" in the period between the moments $t_3$ and $t_4$ shown in FIG. 2. This signal is then delivered to the interface circuit 15 as a signal SIG-.ACK representing the acknowledgment of detection of the remote control signal from the transmitter.

In the described embodiment, the signal $S_4$ takes the high level "HIGH" when the signal $S_6$ takes the low level "LOW". Actually, however, the signal $S_4$ does not always take the high level "HIGH" when the signal $S_6$ takes the low level "LOW", because there is no means for synchronizing the pulses transmitted from the transmitter with the clock pulses CLOCK generated in the receiver. That is, the signal $S_4$ may fail to take the high level "HIGH" when the level of the signal $S_6$ is "LOW". The operation performed by the described embodiment in the event that the signal $S_4$ has failed to take the high level "HIGH" when the level of the signal $S_6$ is "LOW" will be described hereinunder with reference to FIG. 3.

It is assumed here that the D-flip-flop 29 is set at a moment $t_5$ in response to the signal $S_2$ as is the case of the signal timing chart in FIG. 2. If the signal $S_4$ rises at a moment $t_6$ at which the signal $S_6$ in "HIGH", no change is caused in the state of the counter 27 because it has been reset. However, in the D-flip-flop 29 which has not been reset, the output Q, i.e., the signal $S_9$ changes its level from "LOW" to "HIGH" in response to the rise of the signal $S_4$, thereby resetting, through the AND gate 36, the RS-flip-flop constituted by the NOR gates 37 and 38. As a result, the output signal $S_5$ from the RS-flip-flop constituted by the nor gates 37 and 38 is changed from "HIGH" to "LOW", causing the output of the multiplexer to be changed from CLOCK to $\overline{\text{CLOCK}}$. As a result, the phase of the signal $S_6$ is inverted, with the result that the period in which the counter 27 counts the signal $S_4$ and the period in which it does not count are inverted from those shown in the timing chart of FIG. 2. If the received light is the signal light of the frequency $f_s$, the signal $S_4$ rises while the signal $S_6$ is "LOW". Thus, as in the case of the timing chart shown in FIG. 2, the counter 28 counts the 14th pulse at a moment $t_7$ so that the signal $S_{15}$ is changed from "LOW" to "HIGH". In consequence, the signal $S_{16}$ is maintained at the high level "HIGH" so as to input a signal SIG.ACK to the interface circuit in the period between moments $t_8$ and $t_9$.

The operation of the receiver has been described with the assumption that the received light is the signal light having the predetermined signal frequency $f_s$. A description will be made hereinbelow as to the operation of the receiver performed when the received light is a noise light or a signal of a frequency different from the frequency $f_s$ of the signal transmitted from the transmitter.

In the described embodiment, the signal $S_6$ falls to "LOW" level 15 times in the period T in which the counter 28 conducts the counting. If the signal $S_4$ rises only once during each "LOW" period of the signal $S_6$, an increment by one (1) is caused on the content of the counter 28. However, if the signal $S_4$ rises two times or more in each "W" period of the signal $S_6$, i.e., if the received signal has a frequency which is twice or more higher than the frequency $f_s$, the output $Q_2$ of the counter 27, i.e., the signal $S_8$ is changed from "LOW" to "HIGH" so as to reset the counter 28 through the OR gate 31. When such a signal is received during the counting, therefore, the counter 28 starts the counting again from 0 (zero). Thus, the counting period T expires before the counter 28 counts 14 pulses, even if the signal $S_4$ is changed to the regular pulse of the frequency $f_s$ after the resetting. In consequence, signal $S_{16}$ cannot rise.

Similarly, the counting period T expires before the content of the counter 28 reaches 14, so that the signal $S_{16}$ fails to rise also when the frequency of the received signal is lower than the frequency $f_s$ of the remote control signal.

The signal $S_{16}$ also fails to rise when the signal $S_4$ is not a periodic signal and when the frequency of the signal $S_4$, even if this signal is periodic, is different from the remote control signal frequency $f_s$. Namely, in such cases, one or more pulses of the signal $S_4$ rise while the signal $S_6$ is "HIGH" before the counting period T is over, even if the signals $S_4$ and $S_6$ are synchronous at the beginning of the counting period. As a result, the output $S_9$ of the D-flip-flop 29 is inverted as explained before in connection with FIG. 3, so that the timing of counting of the signal $S_4$ by the counter 27 is inverted. At the same time, the counter 28 is reset through the OR gate, so that the counting is commenced again from 0 (zero). Therefore, as stated before, the count value cannot reach 14 before the counting period T expires, so that the signal $S_{16}$ is kept at the level "LOW", thus failing to produce the acknowledgment signal SIG.ACK.

Although a preferred embodiment has been described with reference to FIGS. 1 to 3, it is to be understood that the described embodiment is only illustrative and may be changed or modified in various manners.

The counting period T is represented here as $P \times Nc$, where P represents the period of the remote control signal corresponding to the frequency $f_s$, and the count values with which the received signal is judged as to whether it is the remote control signal are represented by $N_1$-$N_2$. In the described embodiment, the values of Nc, $N_1$ and $N_2$ are 15.5, 14 and 15, respectively. These values, however, may be altered as desired by varying the set conditions of the counter 33 and the AND gate 34 and the setting conditions of the counter 28 and the gate 43. In general, however, the value of Nc is determined to be several to several orders of ten.

It is possible to pose a more strict condition for judgment of the remote control signal by, for example, varying the factors such as the length of Nc, ratio between $N_1$-$N_2$ and Nc and the interval between $N_1$ and $N_2$. The same effect will be obtained also by varying the duty ratio of the clock signal CLOCK.

The counter 28 is capable of counting any pulse stream of a frequency which is below $f_s$ and which can be synchronized with the clock signal CLOCK. Thus, the receiver of the described embodiment is capable of detecting a signal which is obtained by demultiplying the frequency $f_s$. For instance, when light pulses of a frequency which is one half that of the remote control signal frequency $f_s$ are received by the circuit shown in FIG. 1, the counter 28 is capable of counting 7 to 8 before the counting period T expires. Similarly, the counter 28 counts 3 to 4 when the received pulses have a frequency which is one third that of the remote control signal frequency $f_s$. It is, therefore, possible to obtain a receiving circuit which is capable of discriminating a plurality of modes, by arranging such that the transmitter transmits pulse signals of different demultiplying factors such as $f_s$. $f_s/2$, $f_s/3$ and so forth and examining which one of these pulse signals is received, from the content of the counter 28.

As will be understood from the foregoing description, the present invention provides a receiver for use in a remote control system which makes use of a remote control signal of a predetermined period, having counter means for counting a received signal with a timing synchronous with the period of the remote control signal, and judging means which judges the received signal as being the remote control signal when a predetermined number has been counted by the counting means in a predetermined period.

This receiver is capable of operating with a high frequency selectivity, without requiring any coil-type tuning circuit which is necessitated by the conventional systems. The elimination of the coil-type tuning circuit also contributes to a reduction in the size of the receiver, and also to a reduction in the cost of assembly because no adjustment is required.

Furthermore, the margin or allowance for the judgment concerning whether the received signal is the remote control signal can be selected freely by suitably setting the counting period and the count values with which the received signal is judged.

The invention, therefore, improves the reliability of operation of the remote control system and enables the remote control system to operate in a plurality of operation modes through transmission and receipt of control signals in different modes.

What is claimed is:

1. A receiver for use in a remote control system in a portable apparatus which makes use of a remote control signal of a predetermined frequency, comprising:

(A) receiving means for receiving a remote control signal wherein said receiving means comprises means for converting a received signal to a digital pulse signal;

(B) counter means for counting the frequency of the digital signal;

(C) control means for controlling said counter means so as to operate in a stand-by state capable of performing the counting operation in synchronism with the frequency of the remote control signal, said control means comprising:

(i) digital change-over means for enabling said control means to commence the controlling operation in synchronism with the reception of the remote control signal received by said receiving means, said digital change-over means being responsive to a level of the digital signal;

(ii) first digital reset means for resetting said counter means, digitally in response to said receiving means receiving the remote control signal such that a converted digital signal is at a high level at least two times while said counter means is in a stand-by state capable of performing the counting operation;

(iii) second digital reset means for resetting said counter means, digitally in response to said receiving means receiving the remote control signal while said counter means is in an idle state not capable of performing the counting operation;

(D) means for setting a predetermined period; and (E) judging means responsive to the counter means for judging the signal received by said receiving means as being the remote control signal when the value counted by said counter means has reached a predetermined value in the predetermined period.

2. A receiver according to claim 1, wherein said judging means comprises a timer for setting the predetermined period.

3. A receiver according to claim 1, wherein said digital change-over means comprises offsetting means for offsetting commencement of the controlling operation of said control means by a period half of that established by the frequency of said remote control signal.

4. A receiver according to claim 1, wherein said portable apparatus includes a camera.

5. A receiver according to claim 4, further comprising means for producing a shutter release signal in response to an output of said judging means.

6. A portable apparatus having a receiver for use in the remote control system in a portable apparatus which makes use of a remote control signal of a predetermined frequency, comprising:

(A) receiving means for receiving a signal;

(B) means for converting a received signal to a digital signal;

(C) counter means for counting the frequency of the digital signal;

(D) control means for controlling said counter means so as to operate in a state capable of performing the counting operation in synchronism with the frequency of the remote control signal, said control means comprising:

(i) digital change-over means for enabling said control means to commence the controlling operation in synchronism with the reception of a signal received by said receiving means, said digital change-over means being responsive to a level of the digital signal;

(ii) first digital reset means for resetting said counter means, digitally in response to said receiving means receiving a signal such that the resulting digital signal is at a high level at least two times while said counter means is in a state capable of performing the counting operation;

(iii) second digital reset means for resetting said counter means, digitally in response to said receiving means receiving the signal while said counter means is in a state not capable of performing the counting operation;

(E) means for setting a predetermined period; and (F) judging means responsive to the counter means for judging the signal received by said receiving means as being the remote control signal when the value counted by said counter means has reached a predetermined value in the predetermined period.

7. A portable apparatus according to claim 6, wherein said judging means comprises a timer for setting the predetermined period.

8. A portable apparatus according to claim 6, wherein said digital change-over means comprises offsetting means for offsetting commencement of the controlling operation of said control means by a period of half of that established by the frequency of said remote control signal.

9. A portable apparatus according to claim 6, wherein said portable apparatus includes a camera.

10. A portable apparatus according to claim 9, further comprising means for producing a shutter release signal in response to output of said judging means.

* * * * *

UNITED STATES PATENT AND TRADEMARK OFFICE
CERTIFICATE OF CORRECTION

PATENT NO. : 5,066,948

DATED : November 19, 1991

INVENTOR(S) : Yoshiyuki KANEKO

It is certified that error appears in the above-identified patent and that said Letters Patent is hereby corrected as shown below:

COLUMN 2:

Line 9, "S;" should read --$S_1$--; and
Line 16, "output signal" should read --output signal $S_2$--.

COLUMN 3:

Line 14, "illustrative should read --illustration--.

COLUMN 6:

Line 41, "nor" should read --NOR--.

Signed and Sealed this

Thirtieth Day of March, 1993

*Attest:*

STEPHEN G. KUNIN

*Attesting Officer*

*Acting Commissioner of Patents and Trademarks*